United States Patent
Ong et al.

(10) Patent No.: US 7,477,509 B2
(45) Date of Patent: Jan. 13, 2009

(54) QUICK EJECT MECHANISM WITH CABLE DETECTION DEVICE

(75) Inventors: Brett C. Ong, San Jose, CA (US); Leslie N. Keller, Cedar Park, TX (US); William A. De Meulenaere, Newark, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 251 days.

(21) Appl. No.: 11/417,743

(22) Filed: May 4, 2006

(65) Prior Publication Data

US 2007/0258201 A1    Nov. 8, 2007

(51) Int. Cl.
   *G06F 1/16*   (2006.01)
(52) U.S. Cl. .................. 361/683; 361/685; 292/129
(58) Field of Classification Search .......... 361/683, 361/685, 686; 439/159, 928.1; 292/129, 292/DIG. 4
See application file for complete search history.

(56) References Cited

U.S. PATENT DOCUMENTS 6,525,930 B1 * 2/2003 Rumney .................. 361/685
6,666,484 B1 * 12/2003 Branch et al. ............ 292/128

* cited by examiner

*Primary Examiner*—Jayprakash N Gandhi
*Assistant Examiner*—Nidhi Desai
(74) *Attorney, Agent, or Firm*—Osha • Liang LLP

(57) ABSTRACT

An eject mechanism for a module includes a module casing; a module engaged in the module casing; the module including a cable port; and an eject button for allowing disengagement of the module from the module casing. The eject button prevents the module from disengagement when a cable is plugged into the cable port. A method of ejecting a module from a module casing includes disengaging the module from the module casing upon the pressing of an eject button, and preventing the module from disengagement when a cable is plugged into a cable port of the module.

12 Claims, 4 Drawing Sheets

QUICK EJECT MECHANISM WITH CABLE DETECTION DEVICE

BACKGROUND

As computer systems become more common, so does the use of component drives such as floppy disk drives, optical disk drives, and the like become indispensable. The increased use of such components also increases the need for replacement for the purpose of repair or upgrade. These field replaceable parts (FRP), collectively referred to herein as "modules," were originally installed with a number of mounting screws, which each had to be removed before a drive could be removed from the computer case.

More recently clips, or other types of catches, that are releasable by pushing on a release mechanism come standard in most new computers. Such clips hold modules in place within a computer case during normal usage. Typically, this is done by way of a tension spring, however, those skilled in the art will appreciate that many variations exist. Then, upon activation of the release mechanism, the module can be removed from the computer case. Additionally, these "quick release" mechanisms may include additional springs to assist in the ejection of the module.

There are numerous instances where it would become necessary to remove a module from a computer case. The module may fail and need replacement, or the operator may want to install an upgraded or different module. The inclusion of quick release mechanisms inside a computer case allows for easy reconfiguration of the components of the computer system.

SUMMARY

In general, in one aspect, embodiments of the present invention relate to an eject mechanism for a module comprising: a module casing; a module engaged in the module casing; the module comprising a cable port; and an eject button for allowing disengagement of the module from the module casing, wherein the eject button prevents the module from disengagement when a cable is plugged into the cable port.

In general, in one aspect, embodiments of the present invention relates to a method of ejecting a module from a module casing comprising: disengaging the module from the module casing upon the pressing of an eject button, and preventing the module from disengagement when a cable is plugged into a cable port of the module.

Other aspects and advantages of the invention will be apparent from the following description and the appended claims.

DETAILED DESCRIPTION

Exemplary embodiments of the invention will be described with reference to the accompanying figures. Like items in the figures are shown with the same reference numbers.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Embodiments of the invention relate to methods and apparatus for a quick eject mechanism for a module of a computer. More specifically, one or more embodiments of the invention relate to methods and apparatus for a cable detection device integrated into the ejection mechanism of a module.

Figure 1:
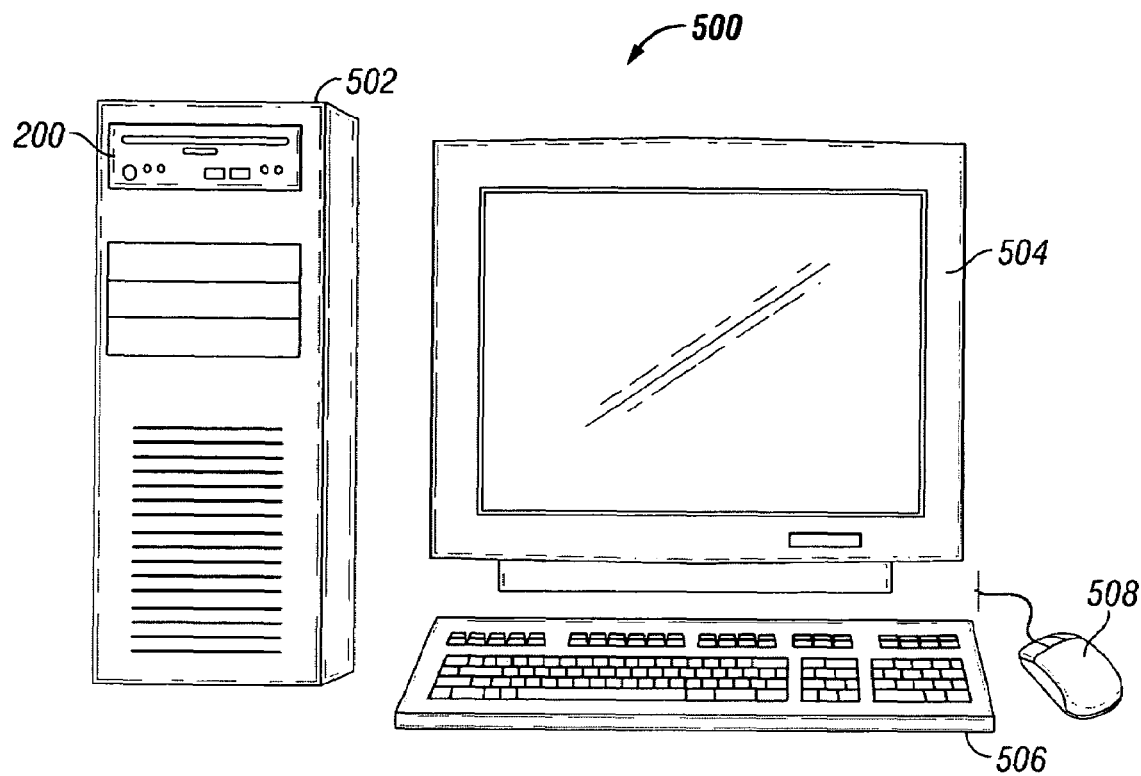
FIG. 1 shows an example of a computer system having a Multi-function module

The invention may be implemented on virtually any type of computer regardless of the platform being used. For example, as shown in FIG. 1, a computer 500 includes a computer tower 502, monitor 504, keyboard 506, a mouse 508, and numerous other elements and functionalities typical of computers today (not shown). The computer tower 502 normally includes, among other components, a module such as Multi-function module 200. The computer system 500 may be connected to a local area network ("LAN") or a wide area network (e.g., the Internet) via a network interface connection (not shown). Those skilled in the art will appreciate that the computer tower 502 could also be any computer case having an internal mounting bracket for modules known in the art.

Figure 2:
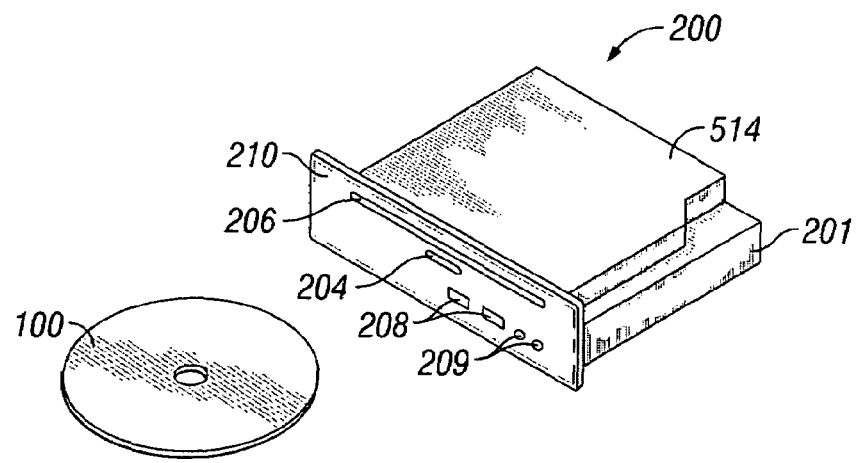
FIG. 2 shows a front perspective view of a module according to one or more embodiments of the present invention.
Figure 3:
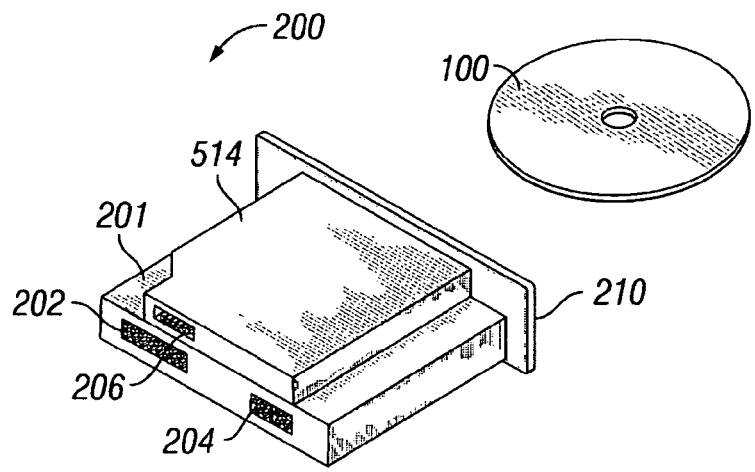
FIG. 3 shows a back perspective view of a module according to one or more embodiments of the present invention.

Referring now to FIG. 2 and FIG. 3, according to one or more embodiments of the present invention, the Multi-function module 200 includes an Optical Disk Drive 514 ("ODD"). The ODD 514 is a device for reading from and writing to an optical disk 100. Optical disks 100 are a common data storage medium, and include such formats as compact disc, digital versatile disc, multi-layer disc, HD DVD, Blue-Ray Disc, and other formats known in the art. The Multi-function module 200 includes a housing 201 which has a front face panel 210 with an opening 206 through which the optical disk 202 is inserted or ejected. A disk eject button 204 is also on the front face panel 210 for ejecting an optical disk tray (not shown) on which the optical disc 100 is placed. Those skilled in the art will appreciate that depending on the type of ODD employed, the disk eject button 204 may instead directly eject the optical disk 100 without use of the optical disk tray. The front face panel 210 also has USB ports 208 and sound ports 209. On the back of the housing 201 is an USB cable port 204 and an Integrated Drive Electronics (IDE) cable port 202. The ODD 514 has on the back face an ODD cable port 206.

Figure 4:
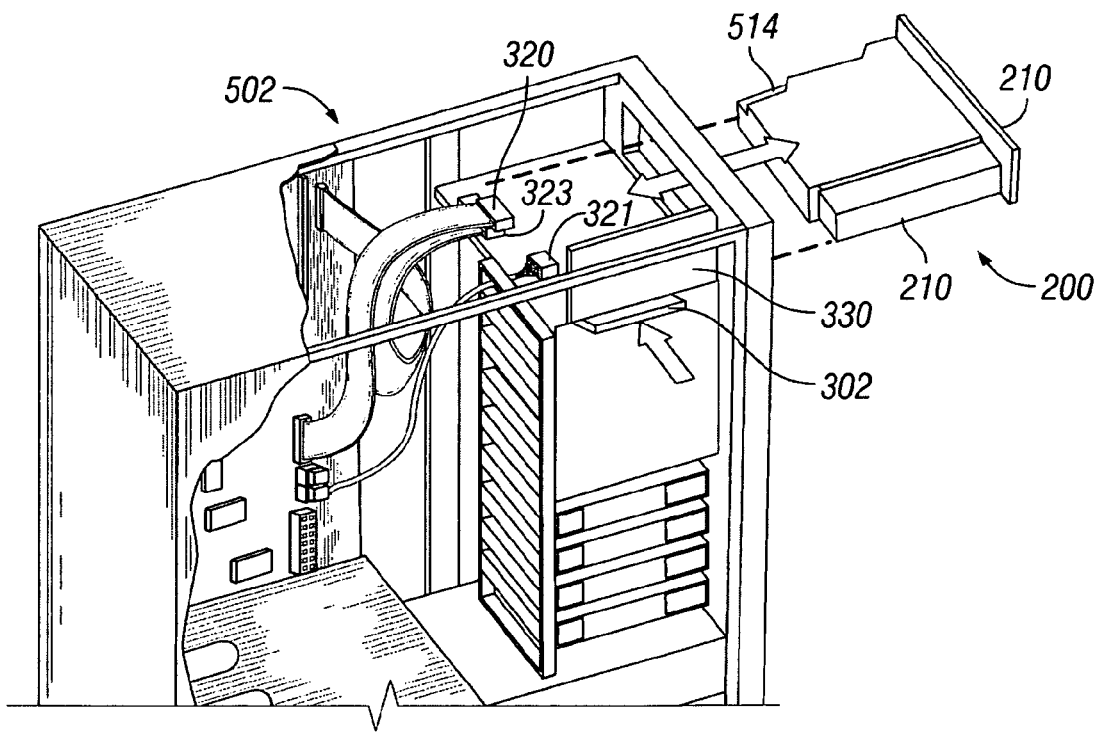
FIG. 4 shows an example of removal of a module from a computer tower case.

As mentioned above, it often becomes necessary for a computer operator to remove a Multi-function module 200, or similar component, from a computer tower 502. FIG. 4 shows an example of removal of Multi-function module 200. An IDE cable 320 is unplugged from the IDE cable port 202, USB cable 321 is unplugged from USB cable port 204, and ODD cable 323 is unplugged from ODD cable port 206. Then, the quick eject button 302 is pressed down, thereby disengaging the Multi-function module 200 from the module casing 330. The Multi-function module can then be removed from the computer tower 502 by the operator. In one or more embodiments, the IDE cable is an integrated power and audio cable.

If the IDE cable 320, USB cable 321, or ODD cable 323 is not unplugged prior to removal of the Multi-function module 200 from the module casing 330, the cable still plugged into the Multi-function module 200 could be damaged by the removal. Accordingly, in one or more embodiments of the present invention, disengagement of the Multi-function module 200 is prevented when one or more of IDE cable 320, USB cable 321, or ODD cable 323 are plugged into the respective IDE cable port 202, USB cable port 204, or ODD cable port 206.

Figure 5:
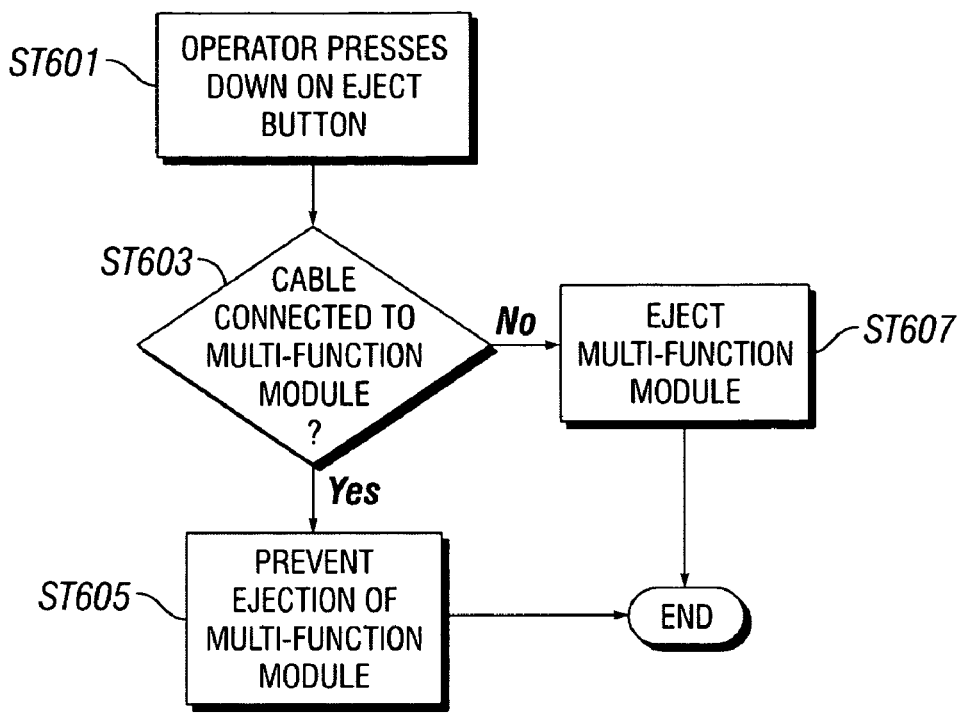
FIG. 5 shows a method of ejecting a module according to one or more embodiments of the invention

Referring now to FIG. 5, a method of ejecting a module according to one or more embodiments of the invention is shown. First, the operator presses down on the module release mechanism, e.g., an eject button ST601. Pressing down on the module release mechanism does not necessarily fully activate the ejection of the module because in accordance with one or more embodiments of the present invention, when the operator puts pressure on the release mechanism and a cable is connected to the module (yes at ST603), then the ejection of the module is prevented ST603. On the other hand, if the cables are not connected (no at ST603), then the module is ejected ST607.

Figure 6:
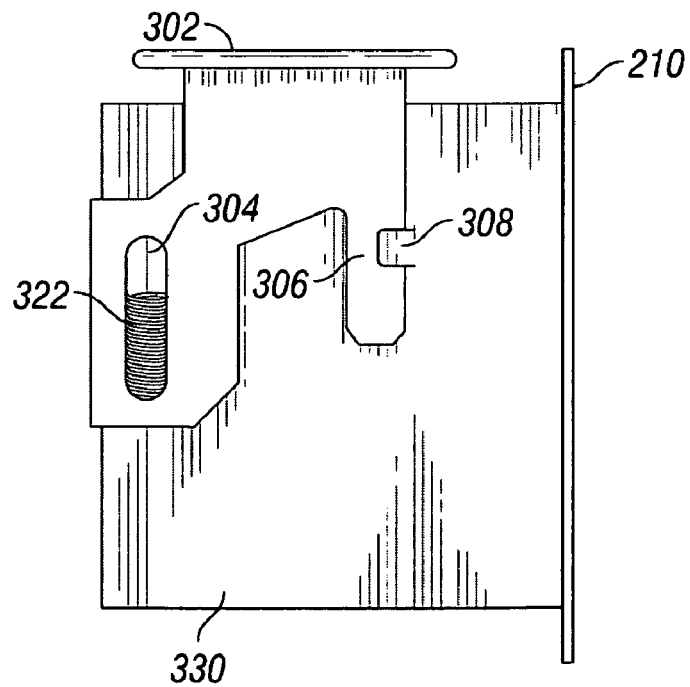
FIG. 6 shows a bottom view of an ejection mechanism according to one or more embodiments of the present invention.
Figure 7:
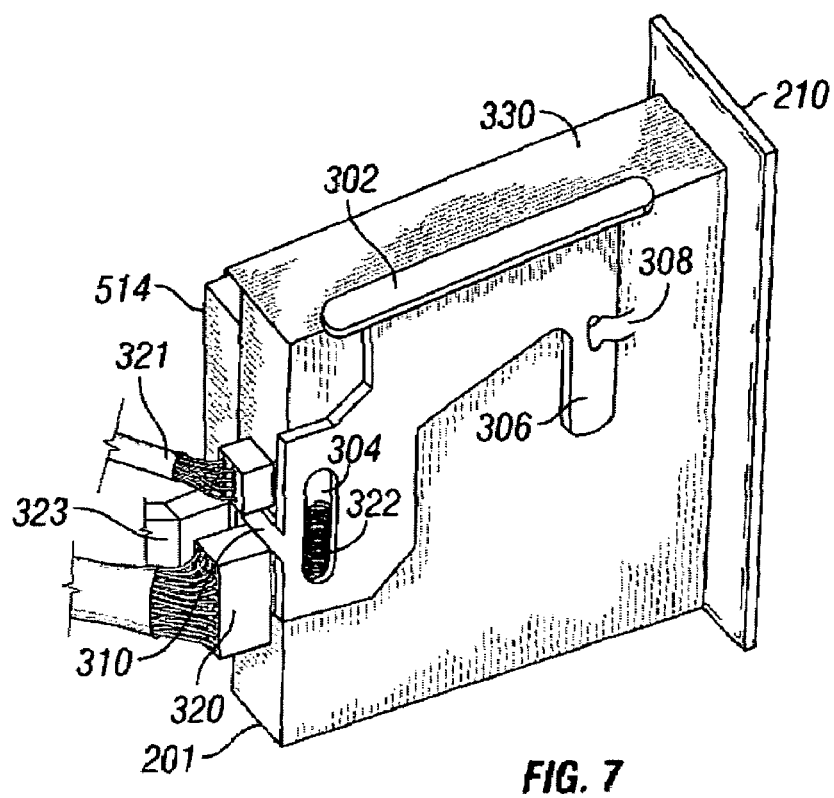
FIG. 7 shows a bottom perspective view of an ejection mechanism with cables plugged in accordance with one or more embodiments of the present invention.
Figure 8:
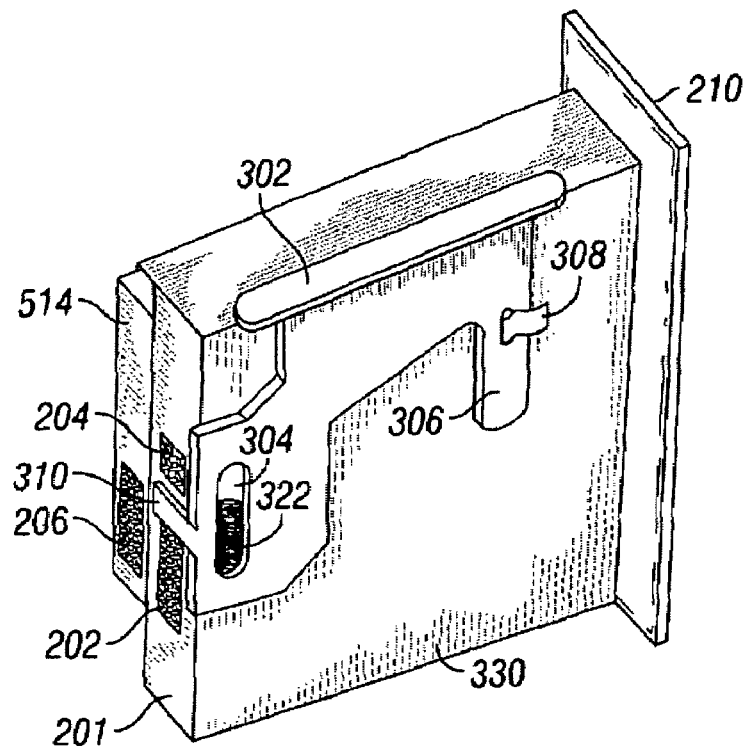
FIG. 8 shows a bottom perspective view of an ejection mechanism with cables unplugged in accordance with one or more embodiments of the present invention.

Referring now to FIGS. 6, 7, and 8, an ejection mechanism according to one or more embodiments of the present invention is shown. The ejection mechanism includes a quick eject button 302, a module casing 330, and a tension spring 322. The tension spring 322 is disposed in an opening 304 in the quick eject button 302, with one end of the tension spring 322 attached to the quick eject button 302, and the other end of the tension spring 322 attached to the module casing 330. When the quick eject button 302 is pressed, the tension spring 322 is stretched, and the resisting force returns the quick eject button 302 to its pre-pressed position.

The quick eject button 302 also has a guided portion 306, which is guided by a guiding protrusion 308 on the module casing 330. The quick eject button 302 wraps around the module casing 330 and a cable interference tab 310 protrudes to a position immediately above the IDE cable 320. In this embodiment, the quick eject button 302 wraps around the back face of the housing 201 between the USB cable port 204 and the IDE cable port 204.

When an attempt to press down the quick eject button 302 is made while the IDE cable 320 is plugged into the IDE cable port 202 as in FIG. 7, the cable interference tab 310 contacts the top of the IDE cable 320, and thereby the quick eject button 302 is prevented from being pressed down. When the IDE cable 320 is not plugged into the IDE cable port 202 as in FIG. 8, there is nothing for the cable interference tab 310 to contact, and the quick eject button 302 therefore is able to be pressed. When the quick eject button 302 is pressed down, the Multi-function module 200 is disengaged from the module casing 330, and can be removed by the operator.

Although in this embodiment the cable interference tab 310 protrudes to a position above the IDE cable 320, those skilled in the art will appreciate that the cable interference tab 310 could also be placed immediately above the USB cable 321 or the ODD cable 323, such that the quick eject button 302 is prevented from being pressed when the USB cable 321 is plugged into the USB cable port 204 or the ODD cable 323 is plugged into the ODD cable port 206.

In one or more embodiments, by including a cable detection mechanism, such as a cable interference tab, on a release mechanism for a module casing in a computer tower or the like, potential damage to the cables connected to the module due to removal of the module prior to disconnection of the cables can be prevented. In one or more embodiments, the release mechanism allows quick ejection of disconnected modules and provides for easy and safe replacement thereof.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An eject mechanism for a module comprising:
   a module casing;
   a module engaged in the module casing, the module comprising an optical disc drive and a cable port;
   an eject button for allowing disengagement of the module from the module casing; and
   a cable interference tab disposed on the eject button,
   wherein the eject button prevents the module from disengagement when a cable is plugged into the cable port,
   wherein the cable interference tab moves co-axially with the eject button when the eject button is pressed, and
   wherein the cable interference tab is positioned such that when the cable is plugged into the cable port, the cable interference tab contacts the cable, and the eject button is prevented from allowing disengagement of the module.

2. The eject mechanism of claim 1, wherein the module further comprises a housing.

3. The eject mechanism of claim 1, wherein the cable is an integrated device electronics cable.

4. The eject mechanism of claim 1, wherein the cable is a USB cable.

5. The eject mechanism of claim 1, wherein the cable is an optical disk drive cable.

6. The eject mechanism of claim 1, further comprising a tension spring, the tension spring being disposed in an opening in the eject button, ends of the tension spring being respectively attached to the module casing and the eject button such that after the eject button is pressed, the tension spring returns the eject button to a pre-pressed position.

7. The eject mechanism of claim 1, wherein the eject button further comprises a guided portion, which is guided by a guiding protrusion on the module casing.

8. A computer system having an eject mechanism comprising:
   a module casing;
   a module engaged in the module casing, the module comprising and an optical disc drive and a cable port; and
   an eject button for allowing disengagement of the module from the module casing; and
   a cable interference tab disposed on the eject button,
   wherein the eject button prevents the module from disengagement when a cable is plugged into the cable port,
   wherein the cable interference tab moves co-axially with the eject button when the eject button is pressed, and
   wherein the cable interference tab is positioned such that when the cable is plugged into the cable port, the cable interference tab contacts the cable, and the eject button is prevented from allowing disengagement of the module.

9. The computer system of claim 8, wherein the eject mechanism further comprises a tension spring, the tension spring being disposed in an opening in the eject button, ends of the tension spring being respectively attached to the module casing and the eject button such that after the eject button is pressed, the tension spring returns the eject button to a pre-pressed position.

10. The computer system of claim 8, wherein the eject button further comprises a guided portion, which is guided by a guiding protrusion on the module casing.

11. The computer system of claim 8, wherein the cable is one of an integrated device electronics cable, a USB cable, or an optical disk drive cable.

12. The computer system of claim 8, further comprising a computer tower, the computer tower comprising a computer tower case in which the module case is disposed.

* * * * *